United States Patent
Kim et al.

(10) Patent No.: US 8,184,642 B2
(45) Date of Patent: May 22, 2012

(54) PCR JITTER REDUCTION IN A VSB AND/OR EVSB MULTIPLEXER SYSTEM

(75) Inventors: Jin H. Kim, Lake Zurich, IL (US); Timothy G. Laud, Libertyville, IL (US); Lay Yee Lim, Arlington Heights, IL (US)

(73) Assignee: Zenith F. ectronics LLC, Lincolnshire, IL (US)

( * ) Notice: Subject to any disclaimer, the term of this patent is extended or adjusted under 35 U.S.C. 154(b) by 243 days.

(21) Appl. No.: 12/635,293

(22) Filed: Dec. 10, 2009

(65) Prior Publication Data

US 2010/0118934 A1 May 13, 2010

Related U.S. Application Data

(63) Continuation of application No. 10/640,805, filed on Aug. 14, 2003, now Pat. No. 7,680,155.

(51) Int. Cl.
*H04L 12/56* (2006.01)
(52) U.S. Cl. .................................. 370/395.71
(58) Field of Classification Search ......... 370/503–519; 375/240.28, 243–245, 293–294, 353–368
See application file for complete search history.

(56) References Cited

U.S. PATENT DOCUMENTS

| | | | |
|---|---|---|---|
| 5,828,414 A * | 10/1998 | Perkins et al. | 375/240.01 |
| 5,905,732 A | 5/1999 | Fimoff et al. | |
| 6,195,368 B1 | 2/2001 | Gratacap | |
| 6,246,701 B1 | 6/2001 | Slattery | |
| 6,549,240 B1 * | 4/2003 | Reitmeier | 348/459 |
| 6,741,290 B1 * | 5/2004 | Wells | 348/512 |
| 7,023,925 B1 * | 4/2006 | Ward | 375/240.26 |
| 2002/0035728 A1 * | 3/2002 | Fries | 725/68 |
| 2002/0154640 A1 | 10/2002 | Wei | |
| 2005/0036521 A1 | 2/2005 | Kim et al. | |
| 2005/0201399 A1 * | 9/2005 | Woodward et al. | 370/412 |
| 2005/0259754 A1 * | 11/2005 | Ho et al. | 375/240.28 |
| 2006/0034375 A1 | 2/2006 | Ward | |

* cited by examiner

*Primary Examiner* — Thai Hoang

(57) ABSTRACT

Program clock references in first and second MPEG data streams are re-stamped in accordance with delays introduced into the first and second MPEG data streams. Accordingly, the program clock references in the first MPEG data stream are re-stamped according to a variable delay in the first MPEG data stream, and the program clock references in the second MPEG data stream are re-stamped according to a variable delay in the second MPEG data stream. The re-stamped program clock references in the second MPEG data stream are corrected according to a fixed delay in the second MPEG data stream. The first and second MPEG data streams are multiplexed, and the multiplexed first and second MPEG data streams are transmitted and received.

6 Claims, 4 Drawing Sheets

PCR JITTER REDUCTION IN A VSB AND/OR EVSB MULTIPLEXER SYSTEM

RELATED APPLICATION

This application is a continuation of U.S. patent application Ser. No. 10/640,805 filed on Aug. 14, 2003 now U.S. Pat. No. 7,680,155 the entire contents of which are incorporated herein by reference.

TECHNICAL FIELD OF THE INVENTION

The present invention relates to the reduction of jitter caused by fixed and/or variable delays imposed by multiplexing systems such as EVSB multiplexing systems.

BACKGROUND OF THE INVENTION

Video images in a digital television system that meets the ATSC standard must be delivered in real time and with a consistent rate of presentation in order to preserve the illusion of motion. However, delays introduced by coding, multiplexing, and transmission can cause a variable amount of delay for video packets arriving at the decoder in the receiver. This delay can impair the decoding process in the receiver. Buffers in the decoder of the receiver are typically used as a mechanism to avoid the problems caused by this delay.

The MPEG-2 standard provides an additional mechanism to ensure video frames can be decoded and delivered to the viewer with a consistent rate of display. This additional mechanism is called the PCR or program clock reference. Values for the program clock reference are embedded into the adaptation field within the transport packets of defined PIDs in the MPEG bit stream. These PCR values provides a clock reference allowing the receiver to deliver a consistent display rate in spite of the variable delays with which the video packets arrive at the receiver.

However, because PCRs are used in the receiver to derive the clock reference, any jitter or drift in the PCR clock can have adverse effects on the receiver's performance. A major source of jitter in the PCR is PCR accuracy. This type of PCR jitter arises from a number of sources. For example, the repetition rate of the transport stream packets may not be a multiple of the PCR clock time, and the input and output data rates on the transport buffers may be poorly managed. Both of these sources are causes of PCR jitter.

One way to reduce the adverse effects of this jitter is to measure the jitter by comparing the PCR timestamps on the received transport stream with a local clock reference. The local reference clock is typically an integral multiple of the PCR clock. Therefore, any truncation and round-off errors in PCR jitter measurements are reduced or eliminated, thus enhancing the accuracy of the measurement. This measure of jitter is then used to adjust receiver decoding timing in order to present a consistent rate of presentation of the moving video images received by a digital television.

The present invention is directed to alternative or additional way of reducing the adverse effects of PCR jitter. According to the present invention, the PCRs are re-stamped in the transmitter in order to present the receiver with PCRs that reduce or eliminate jitter.

SUMMARY OF THE INVENTION

According to one aspect of the present invention, a method of re-stamping program clock references in an MPEG data stream comprises the following: introducing a delay into the MPEG data stream, wherein the MPEG data stream includes the program clock reference; re-stamping the program clock references in the MPEG data stream according to the delay; and, transmitting the MPEG data stream having the re-stamped program clock references.

According to another aspect of the present invention, a method of re-stamping program clock references in first and second MPEG data streams comprises the following: introducing a first variable delay into the first MPEG data stream; re-stamping the program clock references in the first MPEG data stream according to the first variable delay; introducing a second variable delay into the second MPEG data stream; re-stamping the program clock references in the second MPEG data stream according to the second variable delay; introducing a fixed delay into the second MPEG data stream following the re-stamping of the program clock references in the second MPEG data stream; correcting the re-stamped program clock references in the second MPEG data stream according to the fixed delay; multiplexing the first and second MPEG data streams; and, transmitting the multiplexed first and second MPEG data streams.

According to still another aspect of the present invention, a method is provided to receive a signal having re-stamped program clock references in an MPEG data stream. The re-stamped program clock references in the MPEG data stream comprise corresponding original program clock references re-stamped according to a delay. The method comprises the following: recovering the MPEG data stream from the signal; reading the re-stamped program clock references in the MPEG data stream; and, processing the MPEG data stream in accordance with the re-stamped program clock references.

According to yet another aspect of the present invention, a method is provided to receive first and second MPEG data streams. The first MPEG data stream include first re-stamped program clock references, and the first re-stamped program clock references in the first MPEG data stream comprise corresponding first original program clock references re-stamped in accordance with a first variable delay. The second MPEG data stream includes corrected program clock references, the corrected program clock references in second MPEG data stream comprise corresponding second re-stamped program clock references corrected in accordance with a fixed delay, and the second re-stamped program clock references comprise corresponding second original program clock references re-stamped in accordance with a second variable delay The method comprises the following: recovering the first and second MPEG data streams from the signal; reading the first re-stamped program clock references in the first MPEG data stream; processing the first MPEG data stream in accordance with the first re-stamped program clock references; reading the corrected program clock references in the second MPEG data stream; and, processing the second MPEG data stream in accordance with the corrected program clock references.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
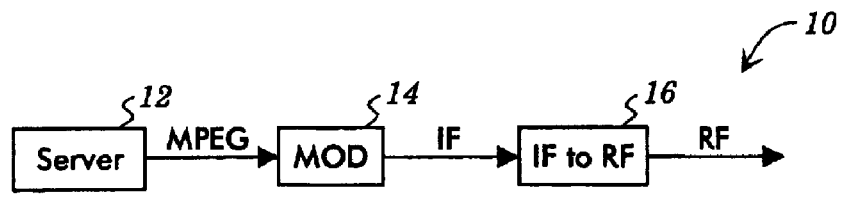
FIG. 1 illustrates a high level view of a VSB transmitter.

FIG. 1 illustrates a high level view of a Vestigial Sideband (VSB) transmitter 10. For VSB transmission, an MPEG data stream is created by an MPEG encoder and may be stored on a server 12. The server 12 spools the data stream out at a 19.39 Mbits/s rate to a modulator 14. The modulator 14 modulates the data stream as an IF signal. The IF signal is converted to an RF signal and transmitted by a block 16 over a communication channel such as the airwaves, a cable, etc.

Figure 2:
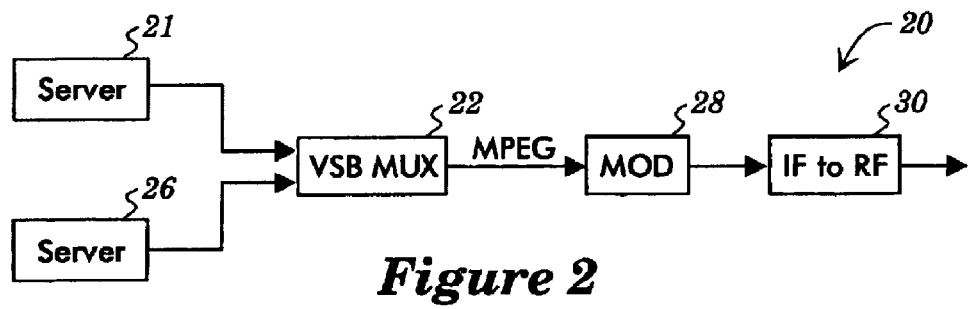
FIG. 2 illustrates a high level view of a transmitter arranged to multiplex two VSB data streams.

When two VSB data streams are to be merged, a VSB transmitter 20 of FIG. 2 is used. In the VSB transmitter 20, a VSB multiplexer 22 multiplexes two MPEG data streams from servers 21 and 26 into one 19.39 Mbits/s MPEG data stream. In addition, the VSB multiplexer 22 allows for flexibility in the data multiplexing ratio. Thus, differing relative amounts of data from the servers 21 and 26 may be mixed by the VSB multiplexer 22 depending on the data multiplexing ratio. A modulator 28 modulates the mixed data stream as an IF signal. The IF signal is converted to an RF signal and transmitted by a block 30 over a communication channel. In order to properly multiplex the two data streams from the servers 21 and 26, PCR jitter must be considered.

When a data stream enters the VSB multiplexer, it is immediately buffered. This buffering allows for varying data rates in the incoming data stream and also provides the necessary buffering of the data for multiplexing. However, this buffering introduces a variable delay in the data path. Because of this variable delay, the PCR values may not be accurate and, thus, PCR jitter can be incurred in the receiver. To correct for this PCR jitter, the PCRs are re-stamped in the VSB multiplexer.

Figure 3:
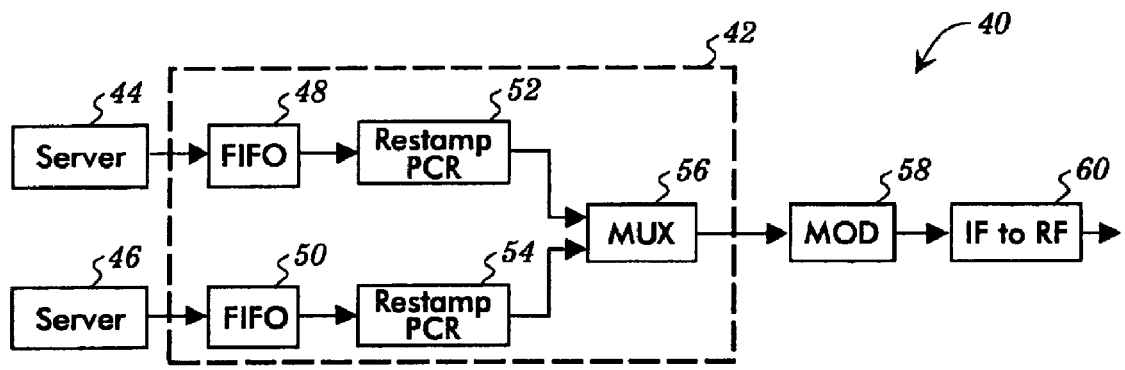
FIG. 3 illustrates the transmitter of FIG. 2 modified in accordance with a first embodiment of the present invention.

A VSB transmitter 40 as illustrated in FIG. 3 accommodates PCR re-stamping. In the VSB transmitter 40, a VSB multiplexer 42 multiplexes two MPEG data streams from servers 44 and 46 into one 19.39 Mbits/s MPEG data stream. As before, the VSB multiplexer 42 allows for flexibility in the data multiplexing ratio. Thus, differing relative amounts of data from the servers 44 and 46 may be mixed by the VSB multiplexer 42 depending on the data multiplexing ratio.

As indicated above, the VSB multiplexer normally includes buffers to allow for varying data rates in the incoming data stream and also to provide the necessary buffering of the data for multiplexing. These buffers are shown in FIG. 3 as FIFOs 48 and 50. In order to allow PCR re-stamping so as to reduce or eliminate PCR jitter, the VSB multiplexer 42 is provided with re-stamp PCR blocks 52 and 54 in accordance with a first embodiment of the present invention. The re-stamp PCR blocks 52 and 54 correct for PCR jitter by altering the PCR stamps in the MPEG data streams supplied to them. This altering of the PCR stamps is referred to as PCR re-stamping. A multiplexer 56 of the VSB multiplexer 42 multiplexes the two PCR re-stamped MPEG data streams as discussed above.

A modulator 58 modulates the mixed data stream as an IF signal. The IF signal is converted to an RF signal and transmitted by a block 60 over a communication channel.

In order to illustrate PCR re-stamping, a fixed delay in the data path of the VSB multiplexer buffer (time invariant buffer) may be assumed. It may further be assumed that the PCR values are spaced 50 ms apart in time and, for simplicity, that the original PCR values increment every 100 kHz clock cycle. Thus, with these assumptions, the difference between two successive PCRs is 5000 clock cycles (50 ms×100 kHz). Finally, it may be assumed that the buffer incurs a 10 ms delay. If the first original PCR, $PCR_1$, occurs at time 0 ms at the input to the buffer, then $PCR_1$ will occur at time 10 ms at the output of the buffer (1000 clock cycles later). Thus, the delayed PCR may be defined as Delayed_$PCR_n$=Original_$PCR_n$+buffer delay in clock cycles for $n \geq 1$. The PCRs are re-stamped by the PCR re-stamp blocks 52 and 54 in order to remove the effect on them of the buffer delay. Accordingly, the re-stamped PCR imposed by the PCR re-stamp blocks 52 and 54 may be defined as Restamped_$PCR_n$=Original_$PCR_n$ for n=1 and as Restamped_$PCR_n$=Restamped_$PCR_{n-1}$+(Delayed_$PCR_n$−Delayed_$PCR_{n-1}$) for n>1.

Using the above definitions, the Delayed $PCR_1$ (the first PCR occurring at time 0) is 1000 (the Original_$PCR_1$ of 0+the buffer delay of 1000), and the Restamped_$PCR_1$ is 0 (the Restamped_$PCR_1$=Original_$PCR_1$ of 0). If the second original PCR, $PCR_2$, occurs at time 50 ms at the input to the buffer, then the Delayed $PCR_2$ is 6000 (the Original_$PCR_2$ of 5000+the buffer delay of 1000), and the Restamped_$PCR_2$ is 5000 (the Restamped_$PCR_1$ of 0+the Delayed_$PCR_2$ of 6000−the Delayed_$PCR_1$ of 1000). If the third original PCR, $PCR_3$, occurs at time 100 ms at the input to the buffer, then the Delayed $PCR_3$ is 11000 (the Original_$PCR_3$ of 10000+the buffer delay of 1000), and the Restamped_$PCR_3$ is 10000 (the Restamped_$PCR_2$ of 5000+the Delayed_$PCR_3$ of 11000−the Delayed_$PCR_2$ of 6000). The index n may set to one upon the reset of the VSB multiplexer 42 so as to initialize the first value of the re-stamped PCR.

This re-stamping procedure which is imposed on their respective MPEG data streams by both of the re-stamp PCR blocks 52 and 54 is shown below in Table 1.

TABLE 1

| n | Time (ms) | Original PCR | Delayed PCR | Re-stamped PCR |
|---|---|---|---|---|
| 1 | 0 | 0 | 1000 | 0 |
| 2 | 50 | 5000 | 6000 | 5000 |
| 3 | 100 | 10000 | 11000 | 10000 |
| . | . | . | . | . |
| . | . | . | . | . |
| . | . | . | . | . |

Now consider a similar system with a variable delay buffer. This variable delay buffer means that the buffer will not always incur a 10 ms delay. The variable delays also cause PCR jitter in the receiver. For example, if the first original PCR occurs at time 0 ms at the input to the buffer, then that same PCR may occur at time 12 ms at the output of the buffer (1200 clock cycles later) due to the buffering. If the second original PCR occurs at time 50 ms at the input to the buffer, then that same PCR may occur at time 61 ms at the output of the buffer (1100 clock cycles later). If the third original PCR occurs at time 100 ms at the input of the buffer, then that same PCR may occur at time 109 ms after the buffer (900 clock cycles later).

In order to reduce this jitter, the PCRs must be re-stamped by the re-stamp PCR blocks 52 and 54 after the buffering process according to the definitions disclosed above. Using the above definitions, the Delayed_PCR$_1$ (the first PCR occurring at time 0) is 1200 (the Original_PCR$_1$ of 0+the buffer delay of 1200), and the Restamped_PCR$_1$ is 0 (the Restamped_PCR$_1$=Original_PCR$_1$ of 0). If the second original PCR, PCR$_2$, occurs at time 50 ms at the input to the buffer, then the Delayed_PCR$_2$ is 6100 (the Original_PCR$_2$ of 5000+ the buffer delay of 1100), and the Restamped_PCR$_2$ is 4900 (the Restamped_PCR$_1$ of 0+the Delayed_PCR$_2$ of 6100−the Delayed_PCR$_1$ of 1200). If the third original PCR, PCR$_3$, occurs at time 100 ms at the input to the buffer, then the Delayed_PCR$_3$ is 10900 (the Original_PCR$_3$ of 10000+the buffer delay of 900), and the Restamped_PCR$_3$ is 9700 (the Restamped_PCR$_2$ of 4900+the Delayed_PCR$_3$ of 10900−the Delayed_PCR$_2$ of 6100).

This re-stamping procedure is shown below in Table 2.

TABLE 2

| n | Time (ms) | Original PCR | Delayed PCR | Re-stamped PCR |
|---|---|---|---|---|
| 1 | 0 | 0 | 1200 | 0 |
| 2 | 50 | 5000 | 6100 | 4900 |
| 3 | 100 | 10000 | 10900 | 9700 |
| . | . | . | . | . |
| . | . | . | . | . |
| . | . | . | . | . |

This variable delay PCR re-stamping procedure is used by the re-stamping PCR blocks 52 and 54 of the VSB multiplexer 42. Applying the definitions above enables the re-stamped PCRs to replace the original PCRs. These re-stamped PCRs take into account the variable delay caused by the respective buffers and, therefore, minimize PCR jitter at the receiver.

The above description relates to the reduction of PCR jitter in the VSB paths of a VSB multiplexer. The description below relates to the reduction of PCR jitter in the VSB and EVSB paths of an EVSB multiplexer which multiplexes EVSB data with VSB data.

The ATSC digital television standard presently provides for the transmission of successive data fields each comprising 313 segments. The first segment of each field is a field sync segment. The field sync segment is composed of four two-level segment sync symbols and space for 828 other two-level symbols. A portion of this space is used for a field sync, and another portion of this space is reserved. Each of the remaining segments of each field is a data segment and comprises four two-level segment sync symbols and 828 n-level data symbols where n is currently eight, although n could be other integers such as two, four, sixteen, etc.

There is presently interest in extending the ATSC digital television standard to allow a field to contain a mix of more robustly coded data (referred to herein as EVSB data) and the data currently provided for in the standard (referred to herein as VSB data). Preferably, the data mix is employed on a segment-by-segment basis such that some segments of a field are used to transmit VSB data exclusively and the remaining segments of the field are used to transmit EVSB segments exclusively. However, it is possible that all data segments of a field could contain either EVSB data segments exclusively or VSB data segments exclusively.

Figure 4:
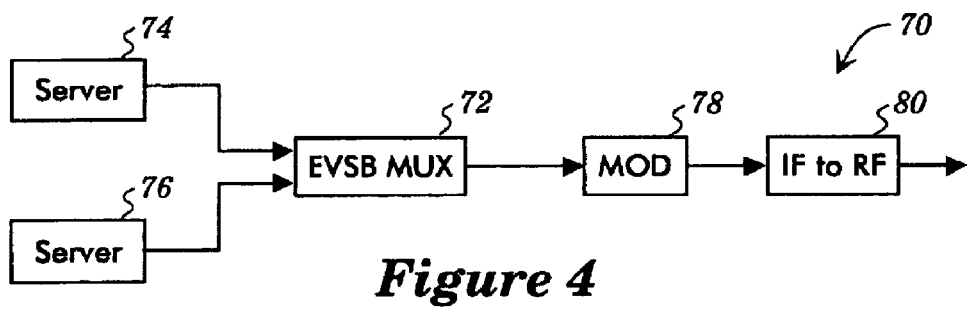
FIG. 4 illustrates a high level view of a transmitter arranged to multiplex a VSB data stream and an EVSB data stream.

As shown in FIG. 4, an EVSB transmitter 70 includes an EVSB multiplexer 72. The EVSB multiplexer 72 multiplexes a VSB MPEG data stream from a server 74 and an EVSB MPEG data stream from a server 76 into one 19.39 Mbits/s MPEG data stream. In addition, the EVSB multiplexer 72 allows for flexibility in the data multiplexing ratio. Thus, differing relative amounts of data from the servers 74 and 76 may be mixed by the EVSB multiplexer 72 depending on the data multiplexing ratio. A modulator 78 modulates the mixed data stream as an IF signal. The IF signal is converted to an RF signal and transmitted by a block 80 over a communication channel. In order to properly multiplex the VSB and EVSB data streams, PCR jitter in the VSB data stream from the server 72 and PCR jitter in the EVSB data stream from the server 74 must be considered.

Figure 5:
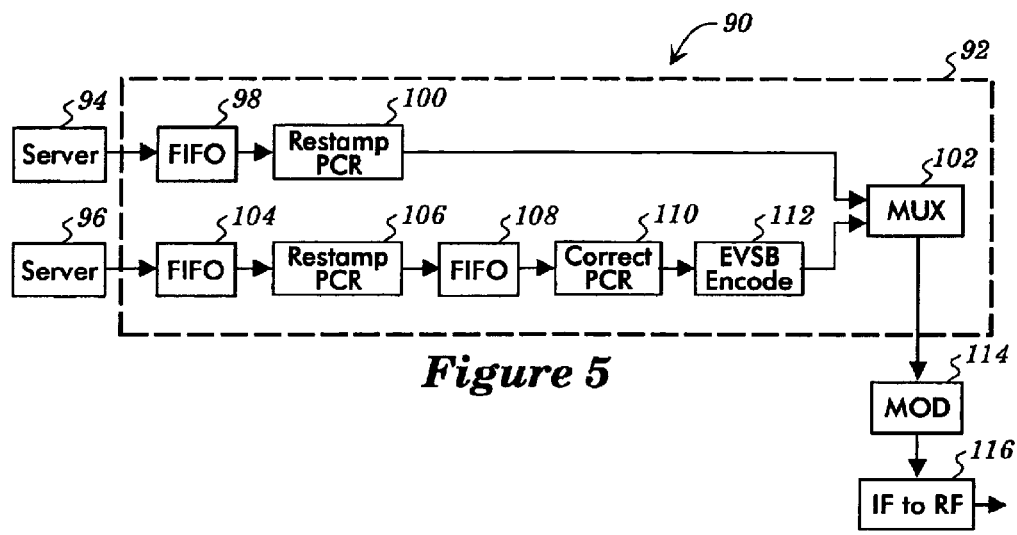
FIG. 5 illustrates the transmitter of FIG. 4 modified in accordance with a second embodiment of the present invention.

An EVSB transmitter 90 as illustrated in FIG. 5 accommodates PCR re-stamping of both the VSB data stream and the EVSB data stream. In the VSB transmitter 90, an EVSB multiplexer 92 multiplexes a VSB MPEG data stream from a server 94 and an EVSB MPEG data stream from a server 96 into one 19.39 Mbits/s MPEG data stream. As before, the EVSB multiplexer 92 allows for flexibility in the data multiplexing ratio. Thus, differing relative amounts of VSB and EVSB data from the servers 94 and 96 may be mixed by the EVSB multiplexer 92 depending on the data multiplexing ratio.

The EVSB multiplexer 92 includes a FIFO 98 to buffer the VSB data stream from the server 94, and a re-stamp PCR block 100 to re-stamp the PCRs in the VSB MPEG data stream. The VSB data stream with the re-stamped PCRs is supplied to a multiplexer 102. The FIFO 98 receives 188-byte packets from the server 94 and stores these packets until the multiplexing ratio applied by the multiplexer 102 requires a 188-byte VSB packet. The re-stamp PCR block 100 operates as described above in connection with FIG. 3 in order reduce or eliminate PCR jitter in the VSB data stream. PCR jitter in the EVSB data stream is discussed below.

A FIFO 104 buffers the EVSB MPEG data stream from the server 96. The FIFO 104 stores 188-byte packets from the server 96. However, only 164-byte packets exit the FIFO 104 because the EVSB encoding process transforms the 164-byte packets into corresponding 188-byte packets which will then be multiplexed with the 188-byte packets from the FIFO 98. In order to allow PCR re-stamping so as to reduce or eliminate PCR jitter in connection with the EVSB MPEG data stream, the VSB multiplexer 92 is provided with a re-stamp PCR block 106. The re-stamp PCR block 106 applies the definitions described above in connection with FIG. 3 so as to correct for PCR jitter by re-stamping the PCR stamps in the MPEG data streams supplied to them.

However, re-stamping the PCRs in the EVSB MPEG data stream from the server 96 does not fully correct the PCRs in this data stream. A second FIFO 108 and a correct PCR block 110 are added to the EVSB multiplexer 92 to properly reduce the PCR jitter in the EVSB path.

Figure 6:
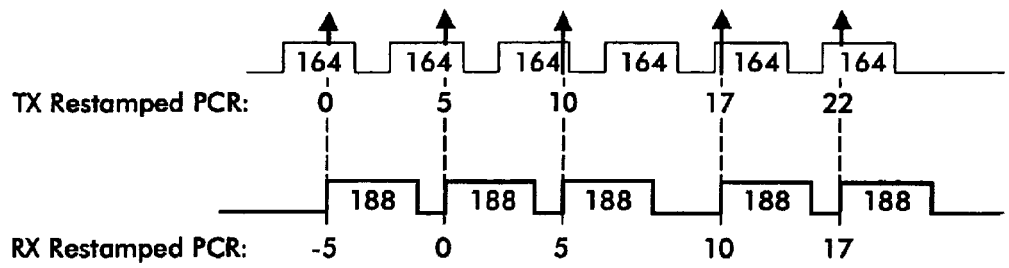
FIGS. 6 and 7 are timing diagram useful in explaining the second embodiment of the present invention.
Figure 7:
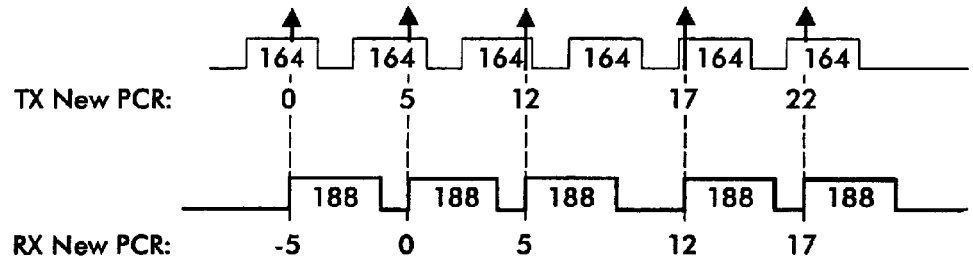

An example of this PCR correction operation is given in the timing diagrams of FIGS. 6 and 7. For simplicity, it may be assumed that every 188-byte packet of an EVSB data stream from the server 96 contains a PCR. The TX re-stamped PCR values given in FIG. 6 show a simplified output of the decode block 152 of FIG. 9 (which is discussed below) where the arrows indicate a start of packet (SOP) for the original 188-byte packet. As can be seen from FIG. 6, the 188-byte packet in most cases spreads over two 164-byte packets. However, once in a while a 188-byte packet will spread over three 164-byte packets, as is the case between PCRs 10 and 17. The three 164-byte packets case incurs a bigger latency than the two 164-byte packets case. The TX re-stamped PCR values of FIG. 6 show this bigger delay.

On the receiver side, a 188-byte packet cannot be constructed until all the necessary 164-byte EVSB packets have been decoded. Hence, there is an incorrect RX re-stamped PCR value (10) for the three 164-byte packets case.

This situation can be corrected by replacing the incorrect TX re-stamped PCR imposed by the re-stamp PCR block 106 with the corrected (new) PCR value. In order to effect this replacement, the FIFO 108 having a fixed delay and the correct PCR block 110 are placed after the re-stamp PCR block 106. The size delay of the FIFO 108 should be less than or equal to 100 ms worth of data. Hence, if the data stream is sent using a 20 MHz clock, each byte takes 500 ns. Therefore, the FIFO 108 has a size according to the following:

$$size \leq \frac{100 \text{ ms}}{500 \text{ ns}} = 200 \text{ K bytes.}$$

The correct PCR block 110 implements the following definitions: for n=1, New_PCR$_n$=Restamped_PCR$_n$; and for n>1, New_PCR$_n$=New_PCR$_{n-1}$+(Restamped_PCR$_{n+1}$−Restamped_PCR$_n$). Restamped_PCR$_{n+1}$ and Restamped_PCR$_n$ are provided by the re-stamp PCR block 106 using the definitions for Delayed_PCR$_n$ and Restamped_PCR$_n$ as set out above.

The new PCRs are shown in the timing diagram of FIG. 7. Applying the PCR correction definition for the new PCR at the output of the correct PCR block 110 corrects the re-stamped PCRs and, therefore, minimizes the EVSB PCR jitter at the receiver.

The PCR re-stamping and correction procedures illustrated by way of example in FIGS. 6 and 7 are summarized below in Table 3.

TABLE 3

| n | Re-stamped PCR | New PCR |
|---|---|---|
| 1 | 0 | 0 |
| 2 | 5 | 5 |
| 3 | 10 | 12 |
| 4 | 17 | 17 |
| 5 | 22 | 22 |
| . | . | . |
| . | . | . |
| . | . | . |

An EVSB encode block 112 of FIG. 5 adds twenty Reed/Solomon bytes to each 164 byte packet to produce corresponding 184 bytes packets, byte interleaves these byte packets using a B=46, M=4 byte interleaver, EVSB encodes these 184 byte packets to produce two 184 byte packets (assuming the use of ½ rate EVSB encoding), and adds four header bytes to each of these 184 byte packets to produce corresponding 188 byte packets for supply to the multiplexer 102 which multiplexes the VSB bytes with the EVSB bytes according to any desired mixing scheme.

A modulator 114 modulates the mixed data stream as an IF signal. The IF signal is converted to an RF signal and transmitted by a transmit block 116 over a communications channel.

Figure 8:
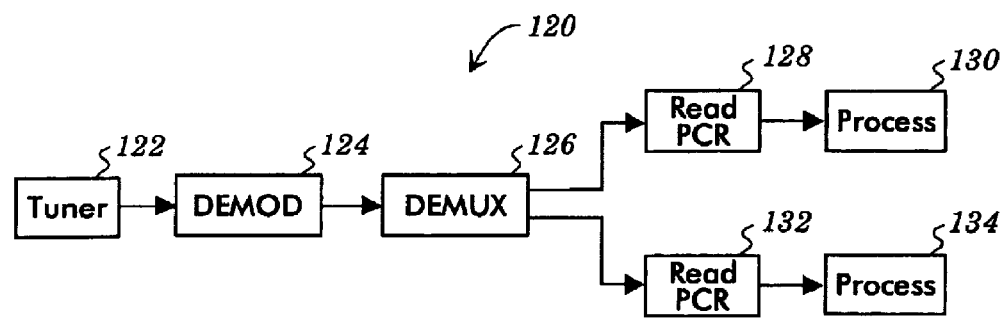
FIG. 8 illustrates a high level view of a receiver arranged to de-multiplex and process two VSB data streams.

As shown in FIG. 8, a receiver 120 receives a multiplexed MPEG data stream comprising first and second VSB MPEG data streams. The receiver 120 includes a tuner that tunes to the RF signal transmitted by the transmitter 40 and a de-modulator 124 that de-modulates the IF signal at the output of the tuner 122. A de-multiplexer 126 separates the demodulated first and second MPEG data streams and sends the first MPEG data stream to a block 128 which reads the program clock references from the first MPEG data stream. A block 130 appropriately processes the first MPEG data stream in accordance with the program clock references read therefrom. The de-multiplexer 126 sends the second MPEG data stream to a block 132 which reads the program clock references from the second MPEG data stream. A block 134 appropriately processes the second MPEG data stream in accordance with the program clock references read therefrom.

Figure 9:
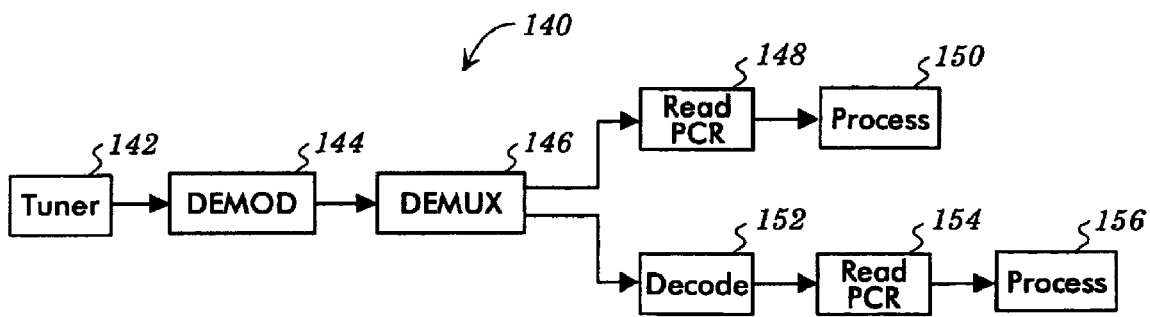
FIG. 9 illustrates a high level view of a receiver arranged to de-multiplex and process a VSB data stream and an EVSB data stream; and, FIG. 10 illustrates an arrangement for determining the variable delay caused by buffers.

As shown in FIG. 9, a receiver 140 receives a multiplexed MPEG data stream comprising a VSB MPEG data stream and an EVSB MPEG data stream. The receiver 120 includes a tuner that tunes to the RF signal transmitted by the transmitter 90 and a de-modulator 144 that de-modulates the IF signal at the output of the tuner 142. A de-multiplexer 146 separates the demodulated VSB MPEG data stream and EVSB data stream and sends the VSB MPEG data stream to a block 148 which reads the program clock references from the VSB MPEG data stream. A block 150 appropriately processes the VSB MPEG data stream in accordance with the program clock references read therefrom. The de-multiplexer 146 sends the EVSB MPEG data stream to a block 152 which decodes the EVSB MPEG data stream using a decoding process that complements the encoding process implemented by the EVSB encode block 112 of FIG. 5. A block 154 reads the program clock references from the decoded EVSB MPEG data stream, and a block 156 appropriately processes the EVSB MPEG data stream in accordance with the program clock references read therefrom.

In order to calculate the variable delay for a particular PCR, this PCR is identified at the input and at the output of the FIFO. Upon identification of the PCR at the input of the FIFO, a counter starts incrementing by one every clock cycle. When the same PCR is found at the output of the FIFO, the counter stops counting. The final count of the counter is the delay of the FIFO.

Figure 10:
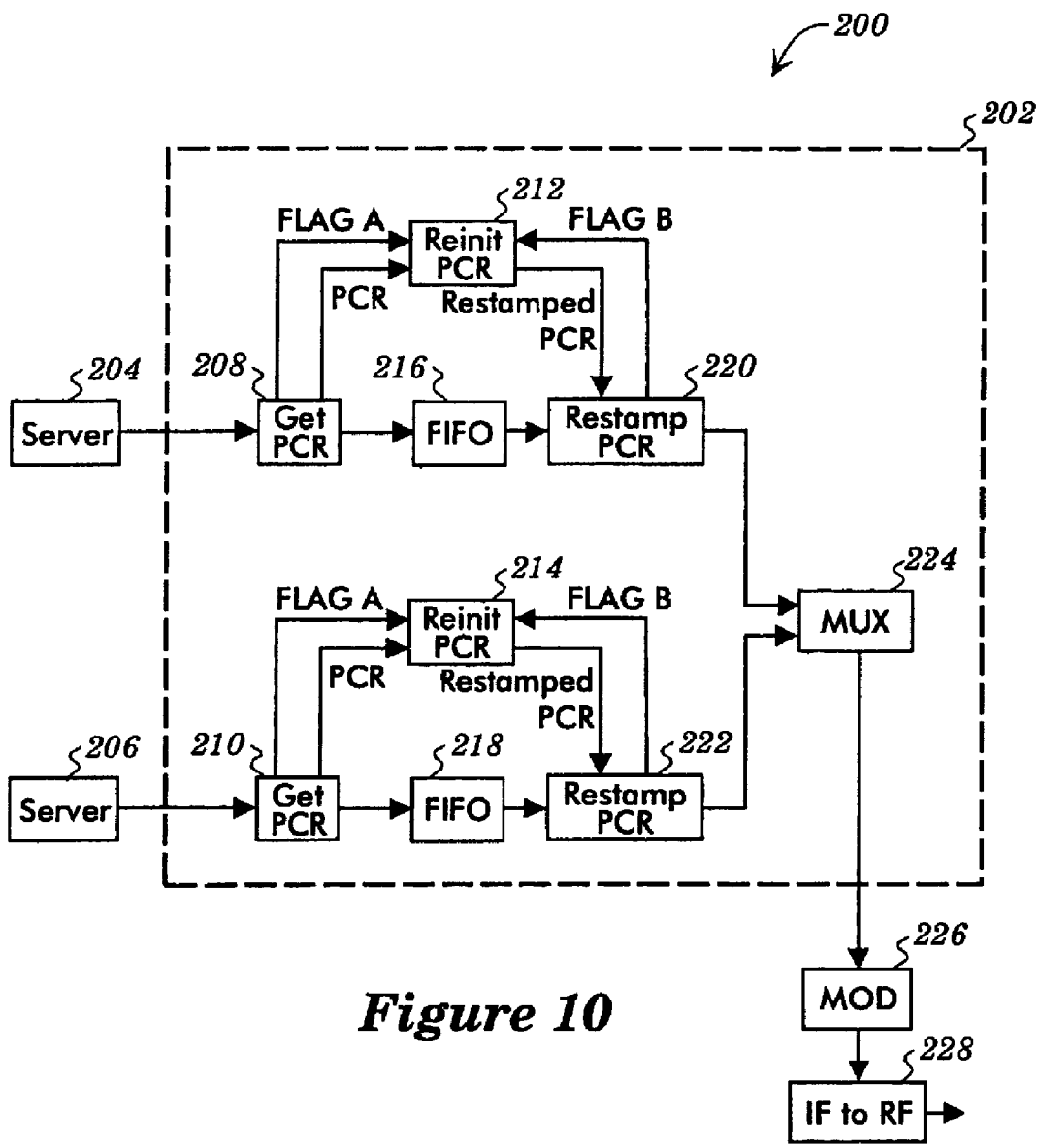

FIG. 10 shows a transmitter 200 that performs this counting function. In the transmitter 200, a multiplexer 202 multiplexes two MPEG data streams from servers 204 and 206 into one 19.39 Mbits/s MPEG data stream. As before, the multiplexer 202 allows for flexibility in the data multiplexing ratio. Thus, differing relative amounts of data from the servers 204 and 206 may be mixed by the multiplexer 202 depending on the data multiplexing ratio.

When the packets flow from the servers 204 and 206 into 'get PCR' blocks 208 and 210, the 'get PCR' blocks 208 and 210 identify the packet carrying a PCR value and assigns the PCR value as the original PCR. The 'get PCR' blocks 208 and 210 send the original PCR and a PCR found flag (A) to 'reinit PCR' blocks 212 and 214. The 'reinit PCR' blocks 212 and 214 start incrementing corresponding counters from initial values set equal to the corresponding original PCRs. Hence, in the example where the original PCR$_1$=0, the internal counters will be set to 0 and increment by one for every clock cycle. For an original PCR$_2$=5000, the internal counters will be set to 5000 and increment by one every clock cycle, and so on.

The following discussion will only focus on PCR$_1$ for simplicity. When the first packet carrying a PCR value appears at the output of FIFOs 216 and 218, this PCR value should correspond to the first PCR value, i.e. original PCR$_1$. When this packet appears at the output of FIFOs 216 and 218, a PCR found flag (B) is sent from the 'restamp PCR' blocks 220 and 222 to the 'rinit PCR' blocks 212 and 214. This PCR found flag (B) stops the internal counters in the 'reinit PCR' blocks 212 and 214 from counting, hence obtaining the value of delayed PCR.

The example given above in Table 2 has a variable delay of 1200 clock cycles for n=1. Thus, upon receiving PCR found flag (B), the internal counter will stop counting and hold a value of 1200. In other words, it took 1200 clock cycles from the moment the internal counter started counting until the moment the internal counter stopped counting.

The same concept applies for n=2 whereby the internal counter is initialized to 5000. When the second PCR packet appears at the output of the FIFO, PCR found flag (B) is sent from the 'restamp PCR' block to the 'reinit PCR' block. The example given has a variable delay of 1100 clock cycles for n=2. Hence, upon receiving PCR found flag (B), the internal counter will stop counting and ends up with a value of 6100.

The 'reinit PCR' blocks 212 and 214 go on to calculate the value for re-stamped PCR and sends the value to 'restamp PCR' blocks 220 and 222. The 'restamp PCR' blocks 220 and 222 merely replace the original PCR value with the re-stamped PCR value. A multiplexer 224 of the multiplexer 202 multiplexes the two PCR re-stamped MPEG data streams.

A modulator 226 modulates the mixed data stream as an IF signal. The IF signal is converted to an RF signal and transmitted by a block 228 over a communication channel.

Modifications of the present invention will occur to those practicing in the art of the present invention. For example, an exemplary arrangement has been described above in relation to FIG. 10 for determining the variable delay that may be used I implementing PCR re-stamping. However, other mechanisms may be used for determining this delay.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of receiving a signal having re-stamped program clock references in an MPEG data stream, wherein the re-stamped program clock references in the MPEG data stream comprise corresponding original program clock references re-stamped according to an amount of a delay caused by a buffer, the method comprising:
   recovering the MPEG data stream from the signal;
   reading the re-stamped program clock references in the MPEG data stream; and,
   processing the MPEG data stream in accordance with the re-stamped program clock references.

2. The method of claim 1 wherein the recovered MPEG data stream comprises first and second MPEG data streams, wherein the recovering of the MPEG data stream from the signal comprises recovering the first and second MPEG data streams from the signal, wherein the reading of the re-stamped program clock references in the MPEG data stream comprises reading re-stamped program clock references in the first and second MPEG data streams, and wherein the processing of the MPEG data stream in accordance with the re-stamped program clock references comprises processing of the first and second MPEG data streams in accordance with the re-stamped program clock references.

3. The method of claim 2 wherein the recovering of the MPEG data stream from the signal comprises:
   tuning to the signal;
   de-modulating the tuned signal; and,
   de-multiplexing the de-modulated signal to recover the first and second MPEG data streams.

4. The method of claim 2 wherein the recovered first and second MPEG data streams comprises corresponding first and second VSB MPEG data streams.

5. The method of claim 1 wherein the re-stamped program clock references in the MPEG data stream comprise corresponding original program clock references re-stamped according to a measured variable delay.

6. The method of claim 1 wherein the re-stamped program clock references in the MPEG data stream comprise corresponding original program clock references re-stamped according to a measured variable buffering caused delay.

\* \* \* \* \*